United States Patent
Onishi et al.

(10) Patent No.: US 6,463,182 B1
(45) Date of Patent: *Oct. 8, 2002

(54) IMAGE PROCESSING APPARATUS AND METHOD FOR REMOVING NOISE NEAR AN EDGE OF AN IMAGE

(75) Inventors: Shinji Onishi, Yokohama; Izumi Matsui, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/780,002

(22) Filed: Dec. 23, 1996

(30) Foreign Application Priority Data

Dec. 28, 1995 (JP) ............................... 7-343892
Dec. 28, 1995 (JP) ............................... 7-343897
May 17, 1996 (JP) ............................... 8-123528

(51) Int. Cl.[7] .............................. G06K 9/40; G06T 5/00
(52) U.S. Cl. ....................................... 382/261; 382/268
(58) Field of Search ................................. 382/260, 261, 382/264, 268, 275, 250; 348/420, 845, 607; 358/433; 375/240.29, 240.24

(56) References Cited

U.S. PATENT DOCUMENTS

| 5,384,849 | A | * | 1/1995 | Jeong | 382/268 |
| 5,555,029 | A | * | 9/1996 | Kim | 382/268 |
| 5,561,532 | A |   | 10/1996 | Ohnishi et al. | |
| 5,751,861 | A | * | 5/1998 | Astle | 382/268 |
| 5,796,875 | A | * | 8/1998 | Read | 382/261 |
| 5,818,964 | A | * | 10/1998 | Itoh | 382/261 |
| 5,883,983 | A | * | 3/1999 | Lee et al. | 382/268 |

* cited by examiner

*Primary Examiner*—Scott Rogers
(74) *Attorney, Agent, or Firm*—Fitzpatrick, Cella, Harper & Scinto (57) ABSTRACT

An image processor includes an input device for inputting image data which is coded in units of blocks, each consisting of a plurality of pixels, and a decoder which decodes the input image data. Also included are a filter which filters the decoded input image data, and a selector which adaptively selects the number of pixels used for filtering processing by the filer, with the number of pixels being changed according to where in the block the pixel to be filtered is located.

11 Claims, 11 Drawing Sheets

| FIG. 4A | FIG. 4B |

☐ DENOTE DIRECTION OF CHANGE OF PIXEL VALUE

∠ DENOTE CHANGE AMOUNT OF PIXEL VALUE
|A−B| : COMPARE WITH TH2
C : COMPARE WITH TH3

IMAGE PROCESSING APPARATUS AND METHOD FOR REMOVING NOISE NEAR AN EDGE OF AN IMAGE

BACKGROUND OF THE INVENTION

1. Field of the Invention

The present invention relates to an image processing apparatus and method associated with noise removal of image data.

2. Related Background Art

Conventionally, when image data or the like is to be recorded using a digital recording/reproducing apparatus, data compression is performed as needed to reduce the required storage capacity for the recorded data.

In image data compression, digital image data (generally, a frame image) is divided into blocks each consisting of M×N pixels. The block data obtained by block division is transformed by a recursive orthogonal transform (e.g., discrete cosine transform). The orthogonal transform coefficient data obtained upon orthogonal transformation is appropriately subjected to quantization and variable-length coding such that the data amount is reduced, and an image free from a sense of incompatibility can be reconstructed in image data expansion. The data compressed in the above manner is modulated (NRZ modulator) into recordable data and then recorded on a recording medium loaded in the recording circuit.

Figure 1:
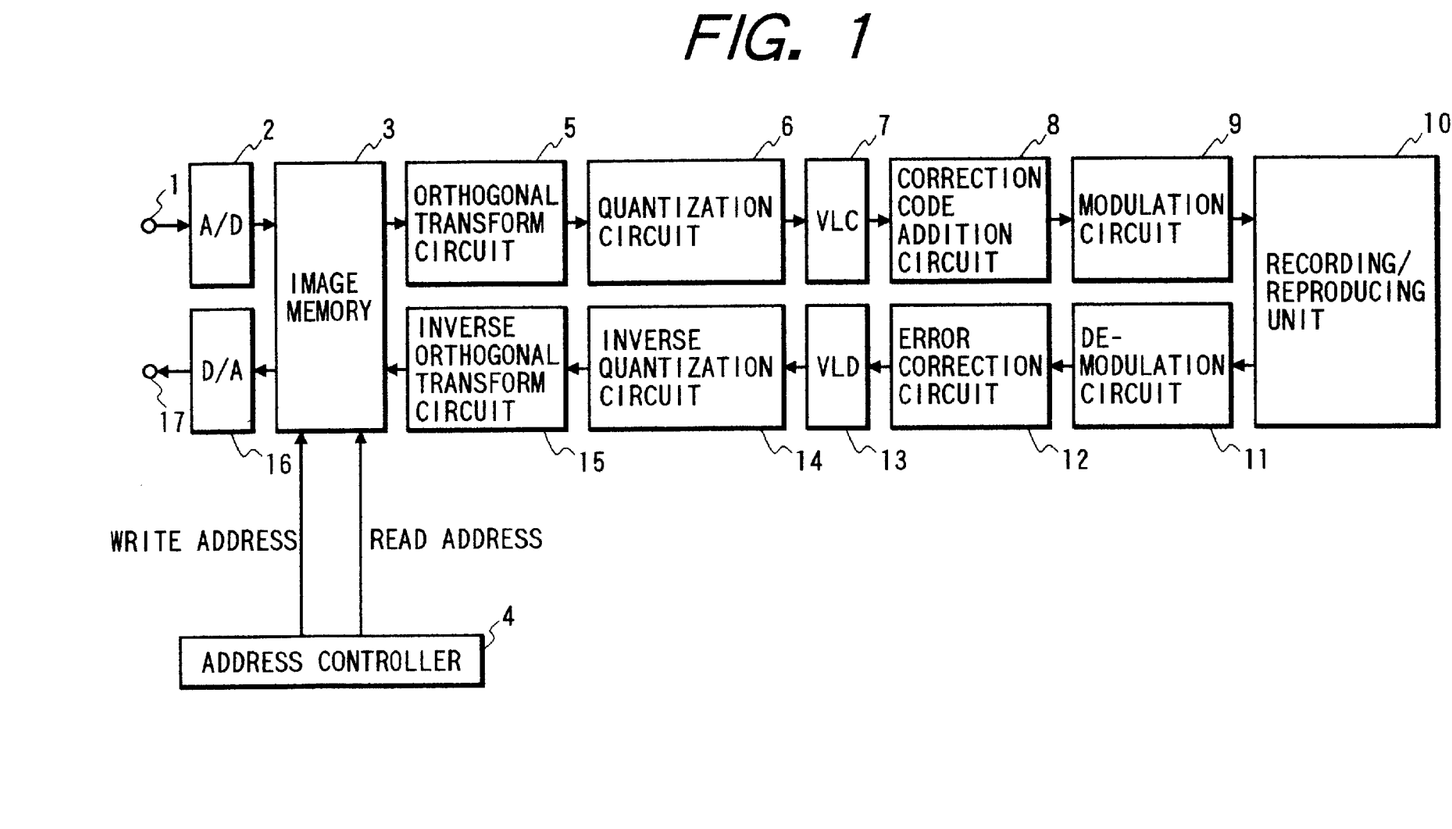
FIG. 1 is a block diagram showing the arrangement of a conventional digital recording/reproducing apparatus.

FIG. 1 is a block diagram showing a conventional digital recording/reproducing apparatus. Referring to FIG. 1, the apparatus comprises an image signal input terminal 1, an A/D converter 2 for performing analog/digital conversion, an image memory 3 for storing image data, an address controller 4 for controlling the write/read addresses of the image memory 3, an orthogonal transform circuit 5 for an performing orthogonal transform such as a DCT (Discrete Cosine Transform) and outputting an orthogonal transform coefficient, a quantization circuit 6 for quantizing the orthogonal transform coefficient, a variable-length coding (VLC) circuit 7 for reducing the data amount of quantized data, a correction code addition circuit 8 for correcting an error in data reproduction, a modulation circuit 9 for minimizing various losses in data recording, and a recording/reproducing unit 10 for recording/reproducing the data.

The apparatus also comprises a demodulation circuit 11 for demodulating the reproduced signal, an error correction circuit 12 for correcting an error with the correction code, an inverse variable-length coding (VLD) circuit 13 for inversely converting the reproduced VLC data into quantized data, an inverse quantization circuit 14 for converting the quantized data into an orthogonal transform coefficient, an inverse orthogonal transform circuit 15 for inversely transforming the orthogonal transform coefficient into the original image data, a D/A converter 16 for performing digital/analog conversion, and an output terminal 17 for outputting the image signal.

The operation will be described below.

In a recording operation, an image signal input to the input terminal 1 is converted into a digital signal by the A/D converter 2 and written at an address of the image memory 3, which is designated by the address controller 4. The address controller 4 controls the addresses such that one frame image is divided in units of blocks each consisting of M×N pixels and read out. The block data in units of M×N pixels is input to the orthogonal transform circuit 5 and transformed into an orthogonal transform coefficient. The orthogonal transform coefficient data is converted into quantized data by the quantization circuit 6. The quantized data is converted into a variable-length code by the VLC circuit 7. A correction code is added to the coded data by the correction code addition circuit 8. The data is modulated by the modulation circuit 9, input to the recording/reproducing unit 10, and recorded on a recording medium such as a magnetic tape.

In a reproducing operation, the reproduced data output from the recording/reproducing unit 10 is demodulated by the demodulation circuit 11. Error correction is performed using the correction code by the error correction circuit 12, and thereafter, the reproduced data is converted into quantized data by the VLD circuit 13. This quantized data is input to the inverse quantization circuit 14 and converted into orthogonal transform coefficient data, and further transformed into digital image data in units of blocks each consisting of M×N pixels by the inverse orthogonal transform circuit 15. This image data is written at an address of the image memory 3, which is designated by the address controller 4. The read addresses of the image memory 3 are controlled by the address controller 4 such that the data in the memory are read along the line direction of the screen. The readout image data is converted into an analog image signal by the D/A converter and output from the output terminal 17.

In the above-described conventional digital recording/reproducing apparatus, quantization of the orthogonal transform coefficient obtained upon block division largely contributes to reduce the code amount of the orthogonal transform coefficient data. However, the DC component of the orthogonal transform coefficient has an error in units of blocks, and consequently, a large visual degradation in image quality, i.e., so-called block distortion appears at the block edge. In such a case, since the block edge is fixed regardless of the image, i.e., a moving picture image or a still picture image, the block distortion always appears at the same position.

In addition to the block distortion, mosquito noise appears near the edge of the image as noise generated by a quantization error.

SUMMARY OF THE INVENTION

The present invention has been made in consideration of the above situation, and has as its object to provide an image processing apparatus and method which can minimize a degradation in image quality caused by block distortion and mosquito noise.

In order to achieve the above object, according to an aspect of the present invention, there is provided an image processing apparatus (method) comprising input means (step) for inputting image data which is coded in units of blocks each consisting of a plurality of pixels, decoding means (step) for decoding the image data input to the input means (step), filter means (step) for filtering the image data decoded by the decoding means (step), and control means (step) for adaptively controlling a filtering condition of the filter means (step) for image data at a block boundary.

According to another aspect of the present invention, there is provided an image processing apparatus (method) comprising input means (step) for inputting image data which is coded in units of blocks consisting of a plurality of pixels, decoding means (step) for decoding the image data input to the input means (step), filter means (step) for filtering the image data decoded by the decoding means (step), and selection means (step) for adaptively selecting the number of pixels used for filtering processing by the filter means (step).

According to still another aspect of the present invention, there is provided an image processing apparatus (method) comprising input means (step) for inputting image data which is coded in units of blocks each consisting of a plurality of pixels, decoding means (step) for decoding the image data input to the input means (step), block edge detection means (step) for detecting a block edge of the image data decoded by the decoding means (step), block distortion detection means (step) for detecting block distortion in the image data decoded by the decoding means (step), and filter means (step) for filtering the decoded image data from the decoding means (step) in accordance with outputs from the block edge detection means (step) and the block distortion detection means (step).

Other objects, features and advantages of the invention will become apparent from the following detailed description taken in conjunction with the accompanying drawings.

DETAILED DESCRIPTION OF THE PREFERRED EMBODIMENTS

The embodiments of the present invention will be described below.

Figure 2:
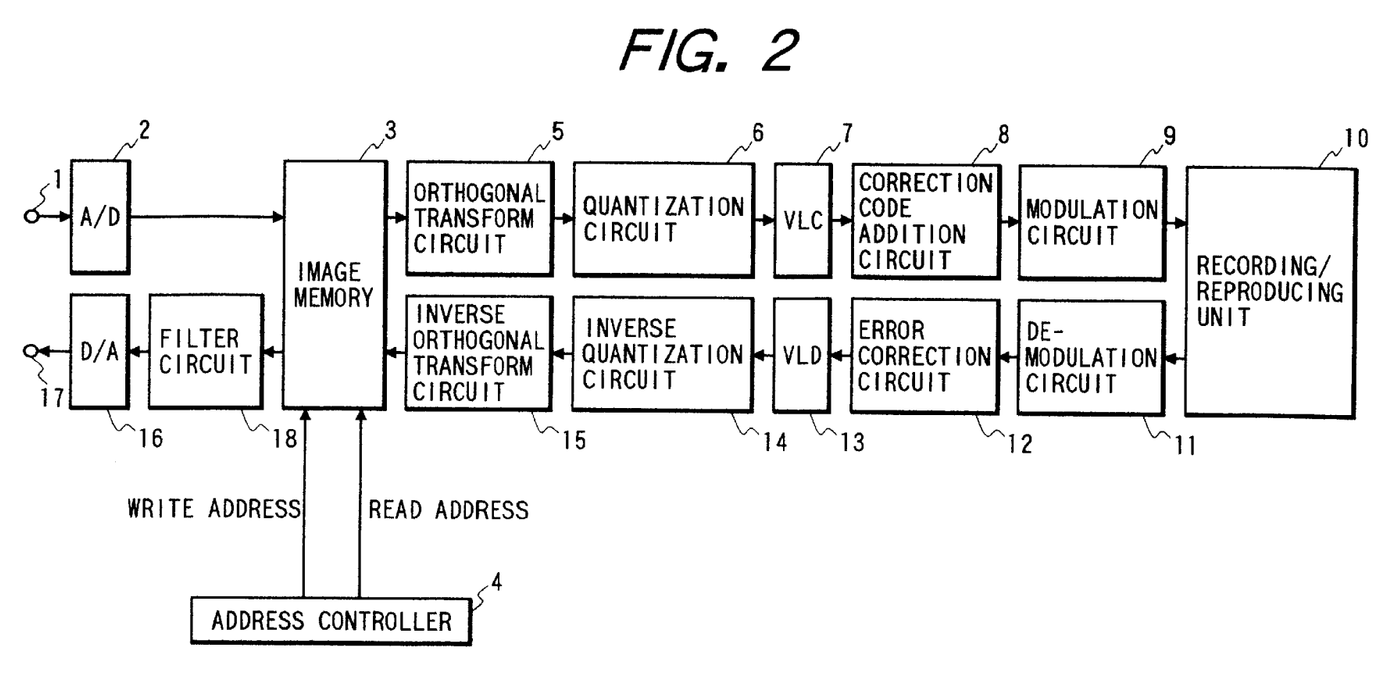
FIG. 2 is a block diagram showing the arrangement of a digital recording/reproducing apparatus according to the present invention.

FIG. 2 is a block diagram showing the arrangement of a digital recording/reproducing apparatus according to the present invention. The same reference numerals as in FIG. 1 denote the same parts in FIG. 2, and a detailed description thereof will be omitted.

The arrangement of this embodiment is different from that shown in FIG. 1 in that a filter circuit 18 according to the present invention is arranged between the image memory 3 and the D/A converter 16.

According to the above arrangement, the above-described mosquito noise and/or block distortion of image data which is read out from the image memory 3 by the address controller 4 is corrected by the filter circuit 18, and the image data is input to the D/A converter 16. Therefore, an image signal from which a degradation in image quality caused by the mosquito noise and/or block distortion is removed can be obtained.

The arrangements of the filter circuit 18 will be described below in detail.

Figure 3:
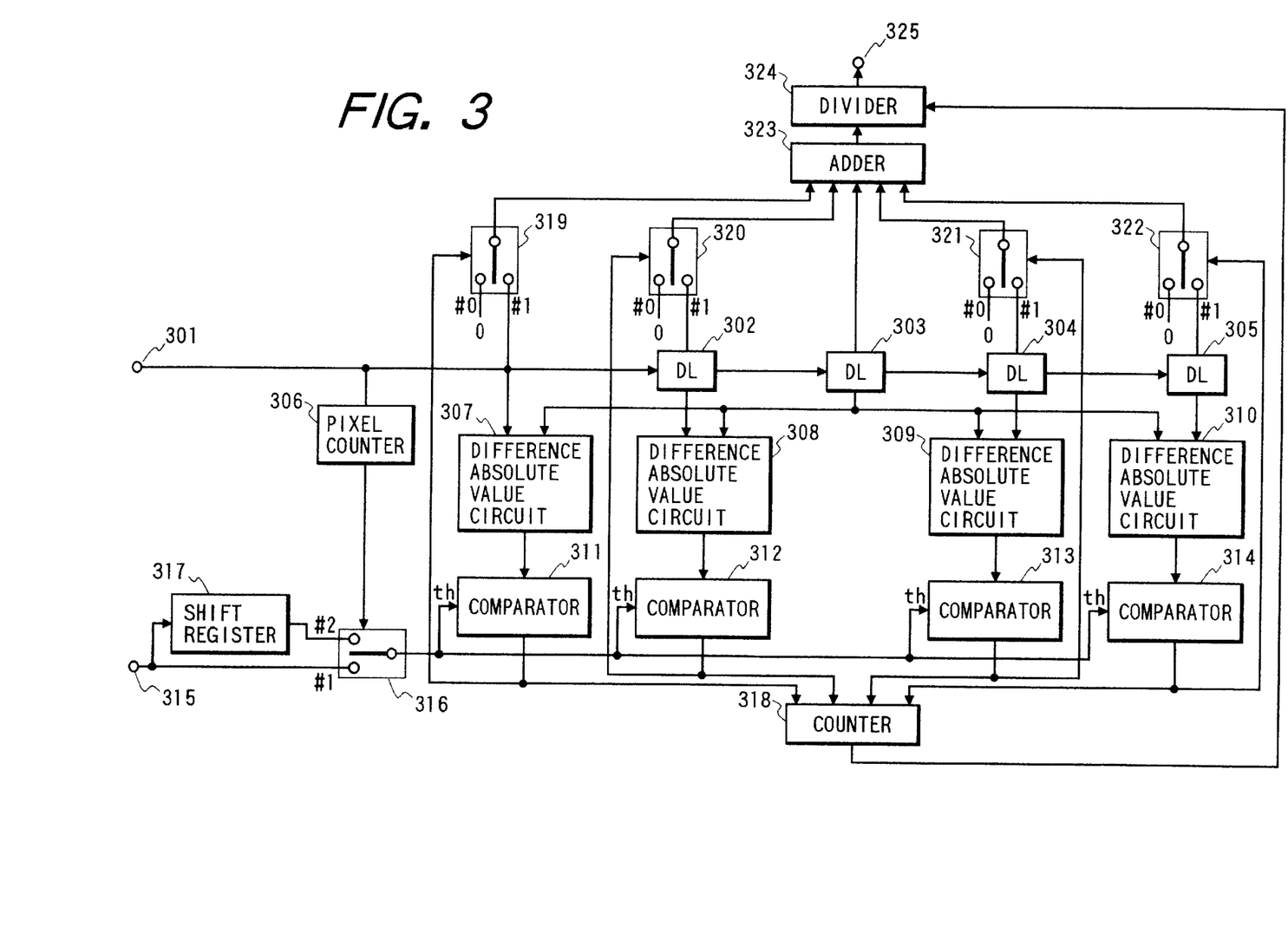
FIG. 3 is a block diagram showing the arrangement of a filter circuit 18 according to the first embodiment of the present invention.

FIG. 3 is a block diagram showing the arrangement of a filter circuit 18 according to the first embodiment of the present invention.

Referring to FIG. 3, a reproduced digital image signal is input from an input terminal 301 in the order of rasters.

Each of a delay device (DL) 302, a DL 303, and a DL 305 delays one pixel. A target pixel for filtering is stored in the DL 303. The second pixel on the right side of the target pixel on the screen is input to the input terminal 301. The first pixel on the right side of the target pixel is stored in the DL 302, the first pixel on the left side is stored in a DL 304, and the second pixel on the left side is stored in the DL 305, so that a horizontal 5-tap filter is formed. A pixel counter 306 counts pixels input from the input terminal 301 to determine whether the pixel stored in the DL 303 is a pixel at the block boundary.

For example, the pixel counter 306 counts the horizontal position of an input pixel to determine whether the pixel is at the horizontal boundary of the block. Difference absolute value circuits 307 to 310 calculate the absolute values between the target pixel and the four pixels on the left and right sides, and the calculation results are input to comparators 311 to 314, respectively.

A threshold value for selecting a pixel used for filtering is input to an input terminal 315. The threshold value data from the input terminal 315 and the data of a threshold value which is doubled via a shift register 317 are input to a selection switch 316. The selection switch 316 is controlled by the pixel counter 306. If the target pixel stored in the DL 303 is a pixel at the block boundary, the terminal #2 side is selected; otherwise, the terminal #1 side is selected.

The threshold value is input from the selection switch 316 to the comparators 311 to 314. If the input difference absolute value is smaller than the threshold value, a signal of level "1" is output; otherwise, a signal of level "0" is output. The results from the comparators 311 to 314 are input to a counter 318, and the counter 318 counts the number of comparators which have output signals of level "1". Therefore, the counter 318 holds the number of pixels (excluding the target pixel) used for filtering.

The comparison results from the comparators 311 to 314 are input to selection switches 319 to 322, respectively. When a signal of level "1" is input, the terminal #1 side is selected. When a signal of level "0" is input, the terminal #0 side is selected. Therefore, when the terminal #1 side is selected, the selection switches 319 to 322 output the values of the respective pixels. When the terminal #0 side is selected, signals of level "0" are output.

Outputs from the selection switches 319 to 322 and the pixel value of the target pixel from the DL 303 are input to an adder 323 and added. The number of pixels (excluding the target pixel) used for filtering is input from the counter 318 to a divider 324. The sum result from the adder 323 is divided by the number of pixels to be finally used for filtering, i.e., (the above number +1), and the result is output to an output terminal 325.

With this arrangement, when the target pixel is a pixel at the block boundary, the threshold value used by the comparators 311 to 314 becomes larger by twice that used in normal mosquito noise removal. For this reason, the image data at the block boundary is filtered with a relatively high intensity, so that the mosquito noise and block distortion in the horizontal direction can be simultaneously minimized.

Figures 4, 4A:
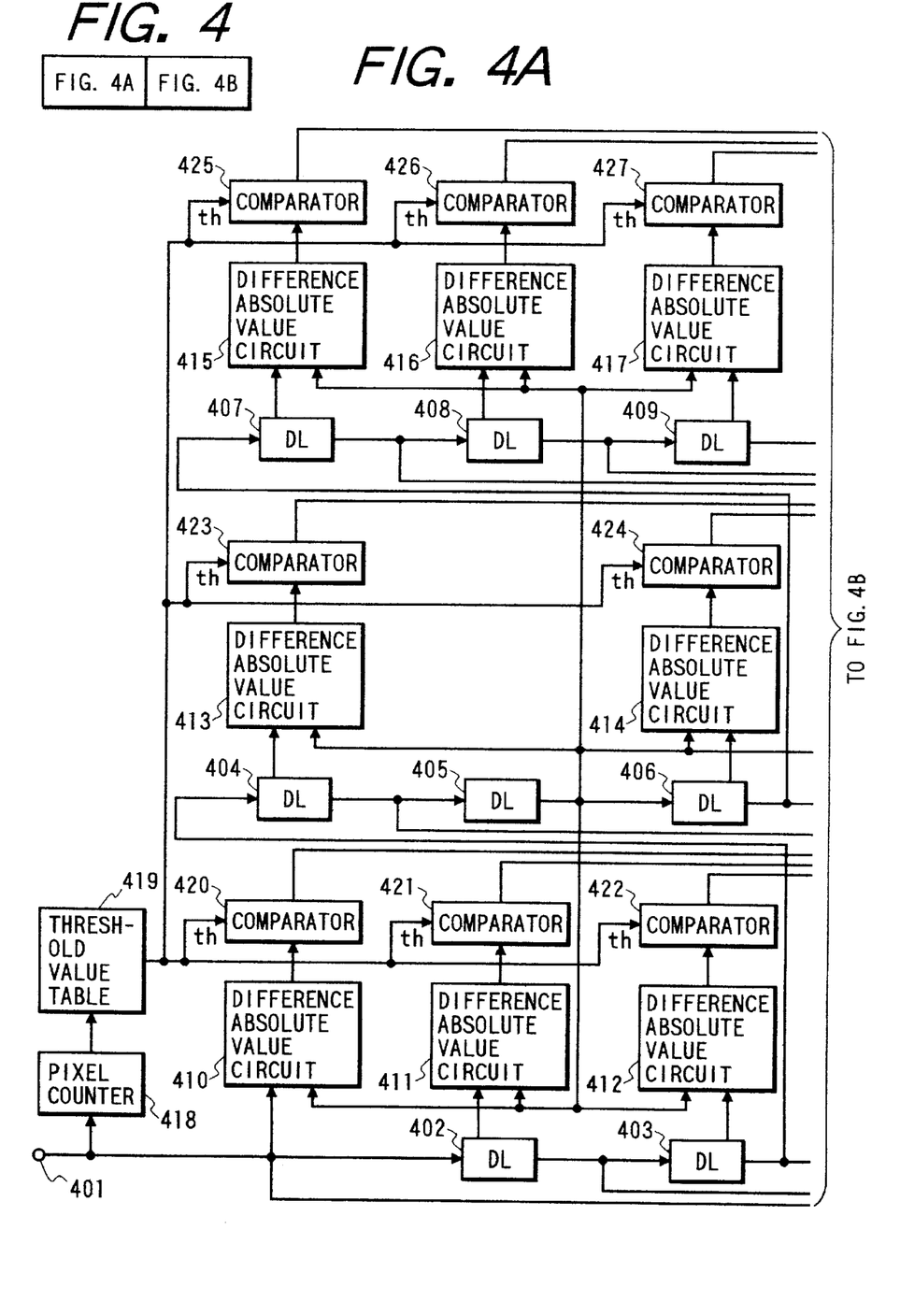
FIG. 4 is comprised of FIGS. 4A and 4B which form a block diagram showing the arrangement of a filter circuit 18 according to the second embodiment of the present invention.
Figure 4B:
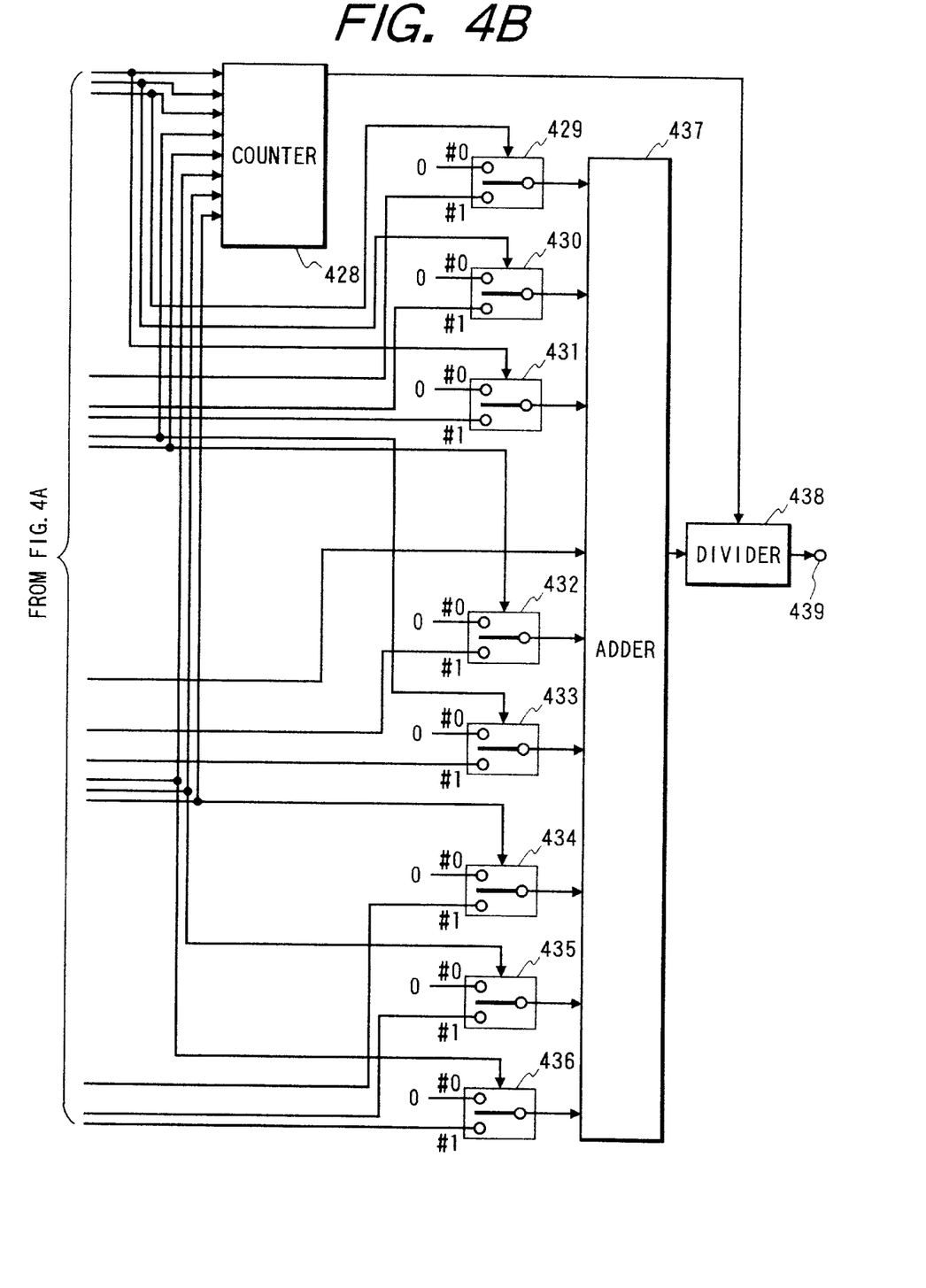

FIGS. 4A and 4B when taken together form a block diagram showing the second embodiment of the present invention.

Referring to FIGS. 4A and 4B, reproduced data is input to an input terminal 401 in the order of rasters. Input pixel values are sequentially delayed by DLs 402 to 409. The delay times of the respective delay devices are set such that when the target pixel for filtering is stored in the DL 405, the pixel value on the lower right side of the target pixel on the screen is input to the input terminal 401, the first pixel value below the target pixel is stored in the DL 402, the pixel value on the lower left side is stored in the DL 403, the first pixel value on the right side is stored in the DL 404, the first pixel value on the left side is stored in the DL 406, the pixel value on the upper right side is stored in the DL 407, the first pixel value above the target pixel is stored in the DL 408, and the pixel value on the upper left side is stored in the DL 409. In an NTSC system, pixel values on one line in the identical field of the target pixel are stored in the DLs 407 to 409. Pixel values on the first lower line in the identical field are input to the input terminal 401 or stored in the DLs 402 and 403.

Difference absolute value circuits 410 to 417 calculate the difference absolute values between the target pixel value stored in the DL 405 and eight adjacent pixel values, respectively.

A pixel counter 418 counts pixels input from the input terminal 401 to determine whether the target pixel stored in the DL 405 is a pixel at the block boundary. For example, the pixel counter 418 counts the horizontal and vertical positions of an input pixel to determine whether the pixel is a pixel at a block boundary along the horizontal or vertical direction.

A threshold value table 419 stores a threshold value used for a block boundary pixel and a threshold value for a normal use and selects a thresh old value to be output in accordance with the determination result from the pixel counter 418. As for the table contents, the value used for a block boundary pixel is set to be larger than the threshold value for a normal use.

Comparators 420 to 427 receive the threshold value from the threshold value table 419 and also receive the difference absolute values from the difference absolute value circuits 410 to 417. If the input difference absolute value is smaller than the threshold value, a signal of level "1" is output; otherwise, a signal of level "0" is output. The results from the comparators 420 to 427 are input to a counter 428, and the counter 428 counts the number of comparators which have output the signals of level "1". Therefore, the counter 428 holds the number of pixels (excluding the target pixel) used for filtering.

The comparison results from the comparators 420 to 427 are also input to selection switches 429 to 436, respectively.

If a signal of level "1" is input, the terminal #1 side is selected. If a signal of level "0" is input, the terminal #0 side is selected. Therefore, the selection switches 429 to 436 output the values of the respective pixels when the terminal #1 side is selected, and output signals of level "0" when the terminal #0 side is selected.

Outputs from the selection switches 429 to 436 and the pixel value of the target pixel from the DL 405 are input to an adder 437 and added. The number of pixels (excluding the target pixel) used for filtering is input from the counter 428 to a divider 438. The sum result from the adder 437 is divided by the number of pixels to be finally used for filtering, i.e., (the above number +1), and the result is output to an output terminal 439.

With this arrangement, when the target pixel is a block boundary pixel, the threshold value for the block boundary pixel is selected from the threshold value table. Therefore, the image data at the block boundary is filtered with a relatively high intensity, so that the mosquito noise and block distortion in the horizontal and vertical directions can be simultaneously reduced.

Figure 5:
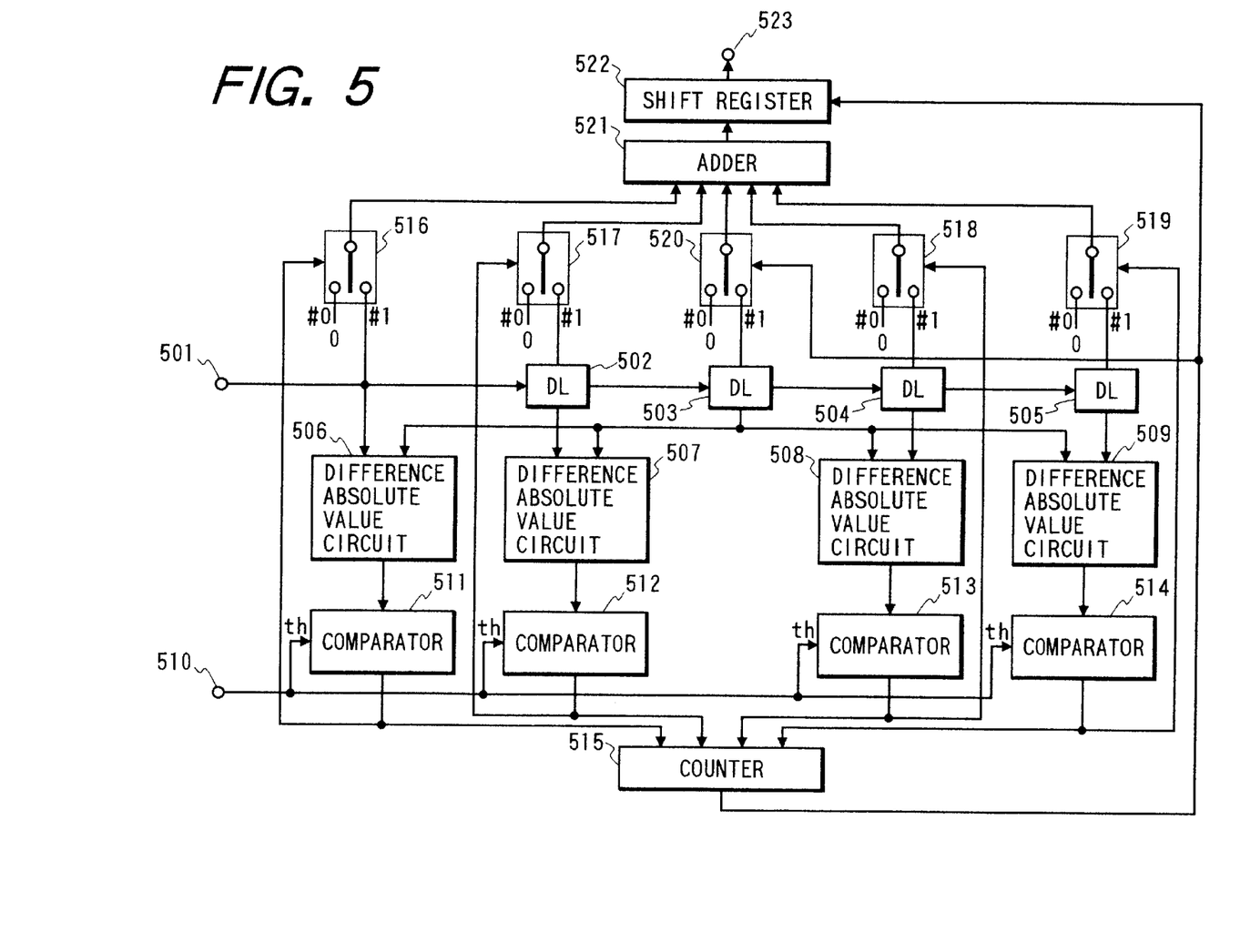
FIG. 5 is a block diagram showing the arrangement of a filter circuit 18 according to the third embodiment of the present invention.

FIG. 5 is a block diagram showing the arrangement a filter circuit 18 according to the third embodiment of the present invention.

Referring to FIG. 5, a reproduced digital image signal is input from an input terminal 501 in the order of rasters. Each of a delay device (DL) 502, a DL 503, a DL 504, and a DL 505 delays one pixel. The target pixel for filtering is stored in the DL 503. The second pixel on the right side of the target pixel on the screen is input to the input terminal 501. The first pixel on the right side is stored in the DL 502, the first pixel on the left side is stored in the DL 504, and the second pixel on the left side is stored in the DL 505, so that a horizontal 5-tap filter is formed. Difference absolute value circuits 506 to 509 calculate the difference absolute values between the target pixel and the four pixels on the left and right sides, and the calculation results are input to comparators 511 to 514, respectively.

A threshold value for selecting a pixel used for filtering is read out from a memory (not shown) and input to an input terminal 510. When the input difference absolute value is smaller than the threshold value, the comparators 511 to 514 output a signal of level "1"; otherwise, a signal of level "0" is output. The results from the comparators 511 to 514 are input to a counter 515, and the counter 515 counts the number of comparators which have output signals of level "1". Therefore, the counter 515 holds the number of pixels (excluding the target pixel) used for filtering.

The comparison results from the comparators 511 to 514 are input to selection switches 516 to 519. If a signal of level "1" is input, the terminal #1 side is selected. If a signal of level "0" is selected, the terminal #0 side is selected. Therefore, the selection switches 516 to 519 output the values of the respective pixels when the terminal #1 side is selected, and output signals of level "0" when the terminal #0 side is selected.

The number of pixels used for filtering is input from the counter 515 to a selection switch 520. If the input value is "0", "1", or "3", the selection switch 520 selects the terminal #1 side to output the value of the target pixel. In this case, the number of pixels to be finally used for filtering is "1", "2", or "4", i.e., a power of 2. If the counter value is "2" or "4", the selection switch 520 selects the terminal #0 side to output a signal of level "0". In this case, the number of pixels to be finally used for filtering is not changed from "2" or "4", i.e., a power of 2.

Outputs from the selection switches 516 to 519 and an output from the selection switch 520 are input to an adder 521 and added. The number of pixels (excluding the target pixel) to be used for filtering from the counter 515 and the sum result from the adder 521 are input to a shift register 522.

If the input value from the counter 515 is "0", only the target pixel value is input from the DL 503 to the adder 521. The shift register 522 outputs the target pixel value to an output terminal 523 without performing any processing.

If the input value of the counter 515 is "1" or "2", two values, i.e., one pixel value of the four pixels adjacent to the target pixel and the target pixel value from the DL 503, or two pixel values of the four pixels adjacent to the target pixel are input to the adder 521. The shift register 522 shifts the sum result from the adder 521 by one bit to halve the value for averaging processing and outputs the value to the output terminal 523.

If the input value of the counter 515 is "3" or "4", four values, i.e., three pixel values of the four pixels adjacent to the target pixel and the target pixel value from the DL 503, or all the values of the four pixels adjacent to the target pixel are input to the adder 521. The shift register 522 shifts the sum result from the adder 521 by two bits to obtain ¼ the value for averaging processing and outputs the value to the output terminal 523.

With this arrangement, the target pixel is adaptively used for filtering to set a power of 2 as the number of pixels to be used for filtering. Therefore, averaging processing can be performed by the shift register 522, and the circuit scale can be reduced.

Figure 6:
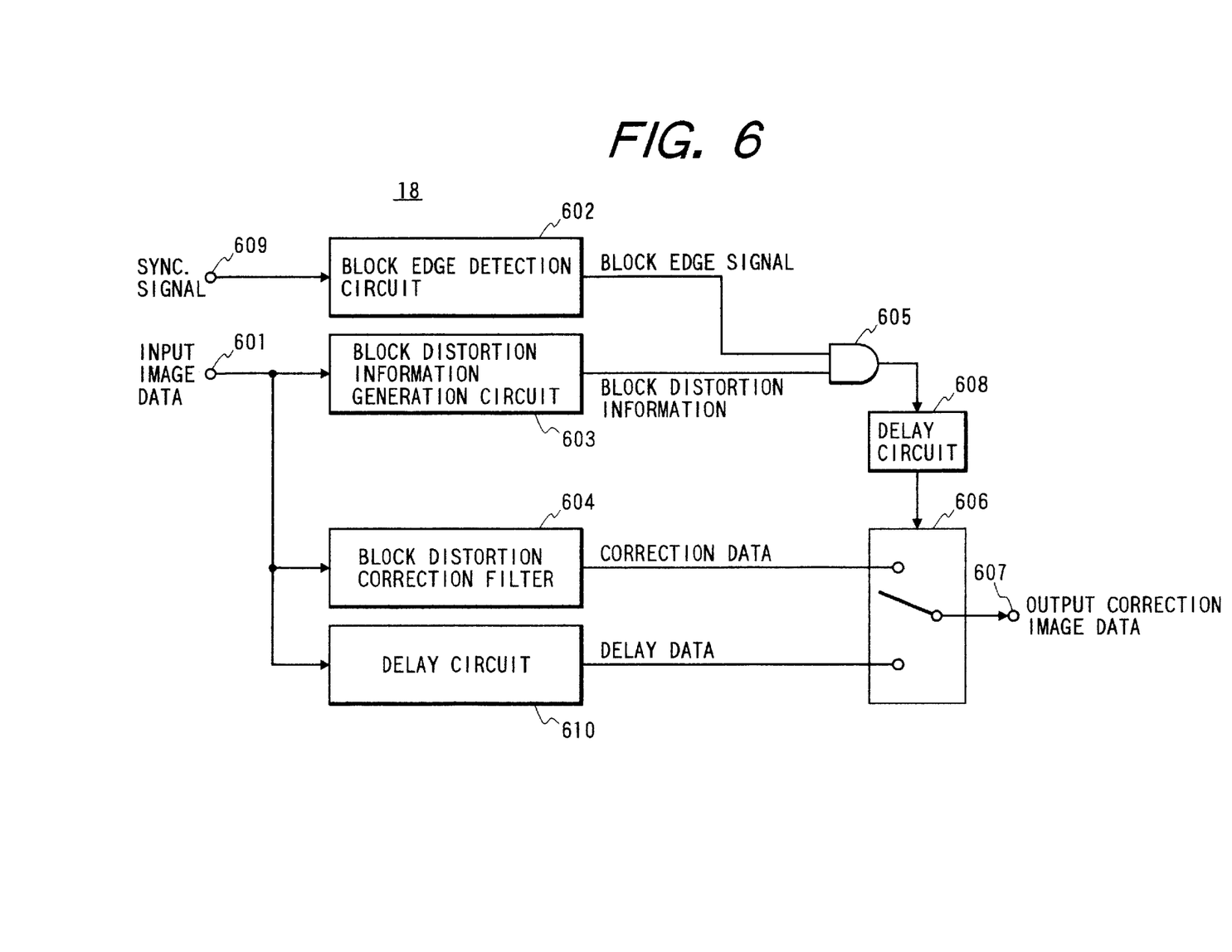
FIG. 6 is a block diagram showing the arrangement of a filter circuit 18 according to the fourth embodiment of the present invention.

FIG. 6 is a block diagram showing the arrangement of a filter circuit 18 according to the fourth embodiment of the present invention.

A sync signal synchronized with the block edge and input to an input terminal 609 is input to a block edge detection circuit 602, and a block edge signal (at high level at a block edge) is input to an AND gate 605. Image data input to an input terminal 601 is input to a block distortion information generation circuit 603, and block distortion information (at high level when distortion is larger than a predetermined value) is input to the AND gate 605. The input image data is input to a block distortion correction filter 604 and converted into correction data in which a degradation in image quality caused by the block distortion is inconspicuous. The input image data is also input to a delay circuit 610 so that the timing with the correction data is adjusted.

The AND gate 605 outputs a selector signal of high level when it is determined at the block edge on the basis of the block distortion information that the distortion is large, thereby controlling a selector 606 via a delay circuit 608. With this operation, the correction data is selected by the selector 606. If the selector signal is at low level, delay image data from the delay circuit 610 is selected. As a result, image data for which the block distortion is corrected is output from the output terminal.

Figure 7:
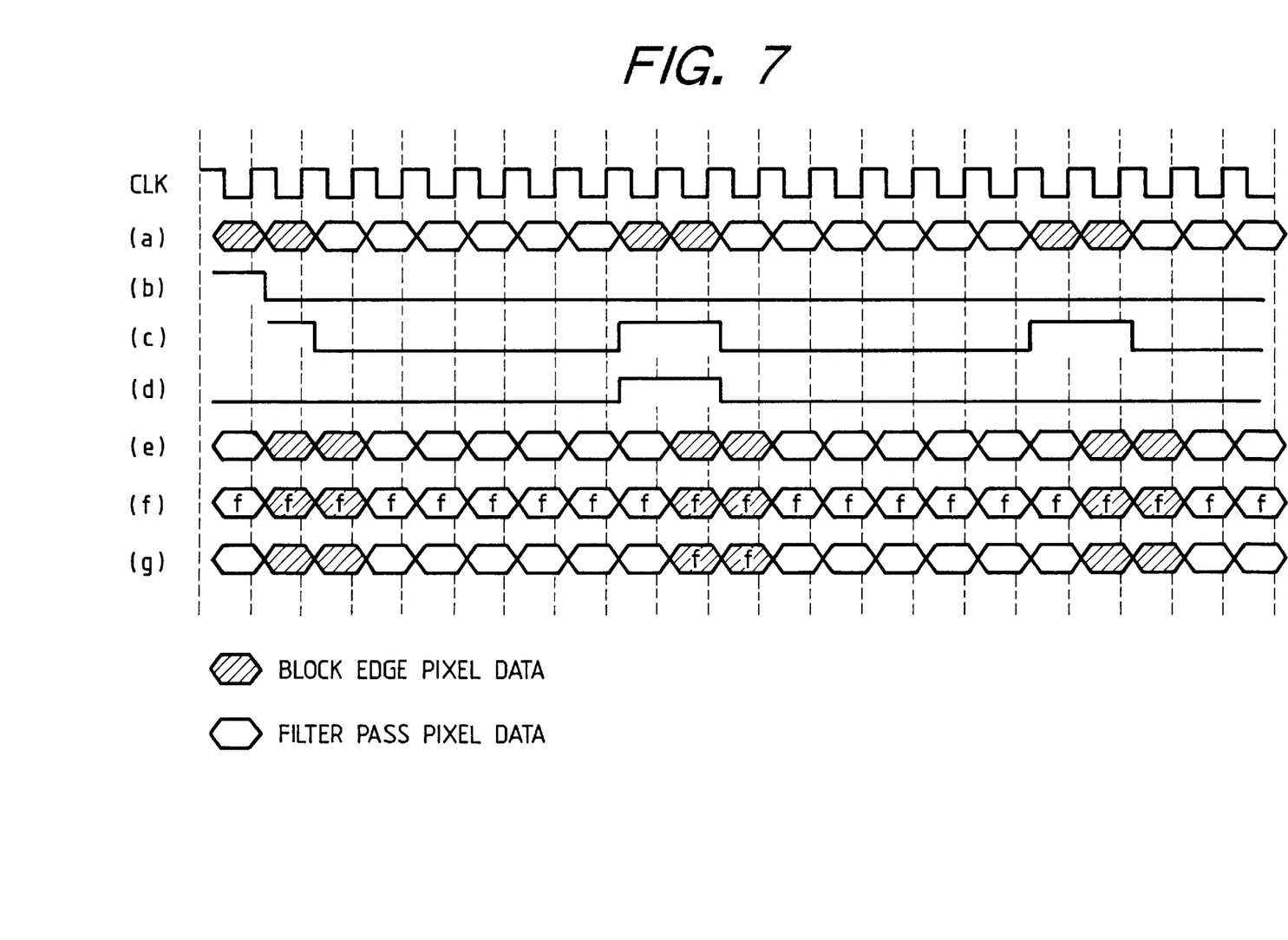
FIG. 7 is a timing chart for explaining the operation of the filter circuit 18 shown in FIG. 6.

FIG. 7 is a timing chart for explaining the operation of the filter circuit 18.

In FIG. 7, (a) represents the input image data; (b), the sync signal; (c), the block edge signal; (d), the block distortion signal; (e), the delayed data; (f), the correction data; (g), corrected output image data from an output terminal 607; and CLK, a clock. As shown in FIG. 7, the pixel data at the block edge, in which the block distortion is determined to be large, is replaced with the correction data.

Figure 8:
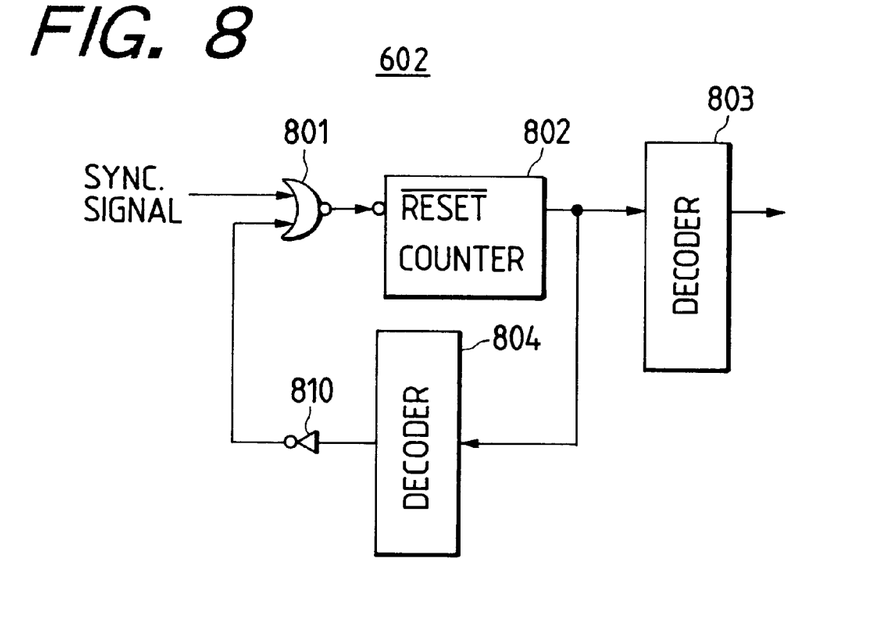
FIG. 8 is a block diagram showing the arrangement of a block edge detection circuit 602.

FIG. 8 is a block diagram showing the arrangement of the block edge detection circuit 602. The block edge detection circuit 602 comprises a NOR gate 801, a counter 802, decoders 803 and 804, and a NOT gate 810.

With this arrangement, when data is to be read out from an image memory 3 along the horizontal direction, the block edge appears at a predetermined period. When the data from the sync signal synchronized with the block edge is counted, the block edge can be detected. The decoder 803 decodes the period at which the block edge appears, and the decoder 804 decodes the period of the blocks in the horizontal direction. The NOR gate 801 resets the counter 802 in accordance with the sync signal or an output from the decoder 804.

Figure 9:
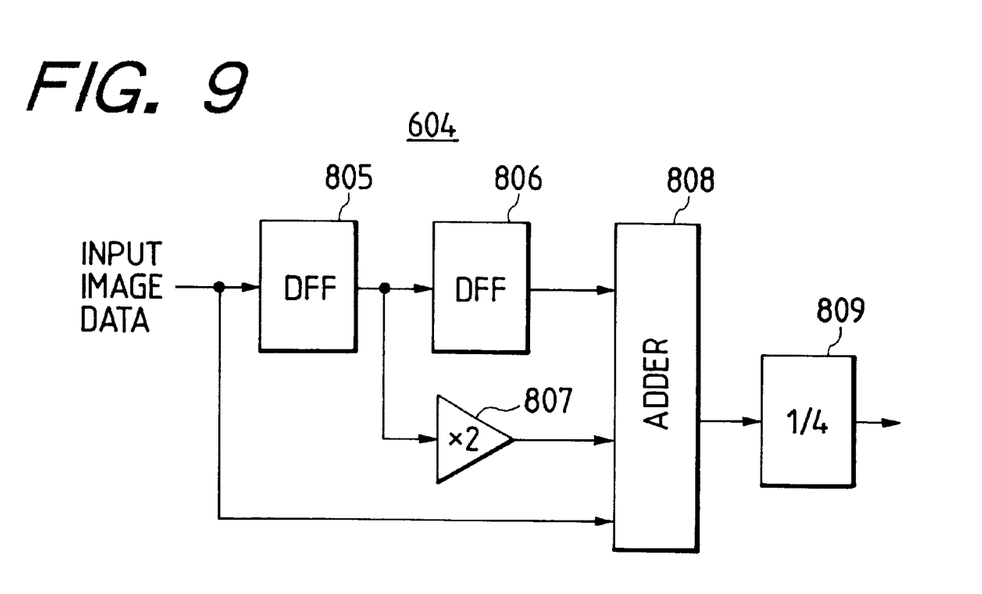
FIG. 9 is a block diagram showing the arrangement of a block distortion correction filter 604.

FIG. 9 is a block diagram showing the arrangement of the block distortion correction filter 604. The block distortion correction filter 604 comprises D flip-flops (DFFs) 805 and 806 each of which delays input pixel data by one pixel, a double coefficient unit 807, an adder 808, and a ¼ coefficient unit 809. The circuit shown in FIG. 9 constitutes a (1, 2, 1) low-pass filter for removing a high-frequency component including a block distortion component.

Figure 10:
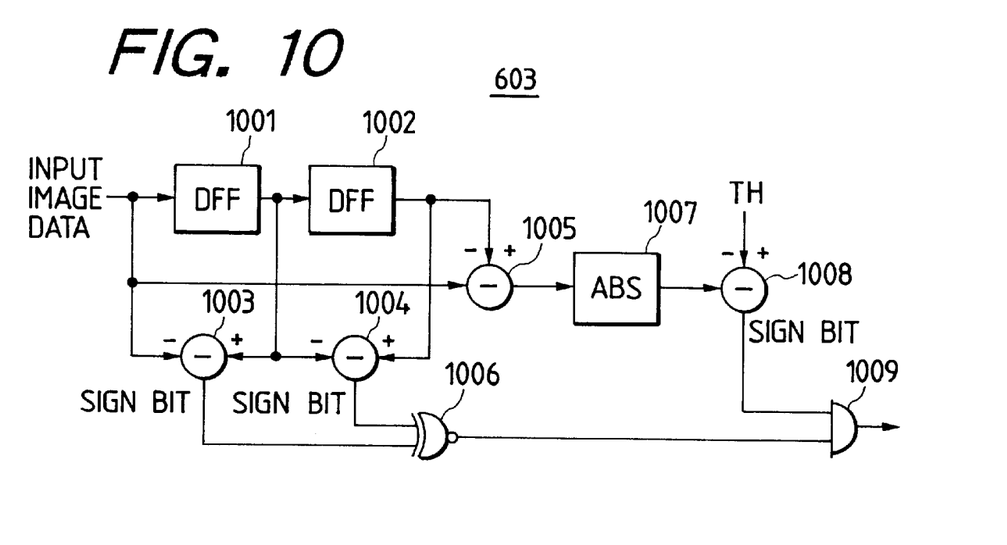
FIG. 10 is a block diagram showing the first arrangement of a block distortion information generation circuit 603.

FIG. 10 is a block diagram showing the first arrangement of the block distortion information generation circuit 603.

Referring to FIG. 10, the block distortion information generation circuit 603 comprises DFFs 1001 and 1002, subtracters 1003, 1004, 1005, and 1008, an EX (exclusive) NOR gate 1006, an absolute value circuit 1007, and an AND gate 1009.

According to the above arrangement, the directions of changes of two adjacent pixel values of three continuous pixel values are detected by the subtracters 1003 and 1004. If the directions of changes equal, a signal of high level is output from the EXNOR gate 1006. In addition, the difference absolute value between pixels separated by two pixels is detected by the absolute value circuit 1007. If the difference absolute value is smaller than a threshold value TH, the sign bit of the output from the subtracter 1008 is high (negative). Therefore, when the change amount between the pixel values separated by two pixels is smaller than the threshold value TH, and the directions of changes equal, it is determined that the block distortion is large. At this time, the block distortion information goes high.

Figure 11:
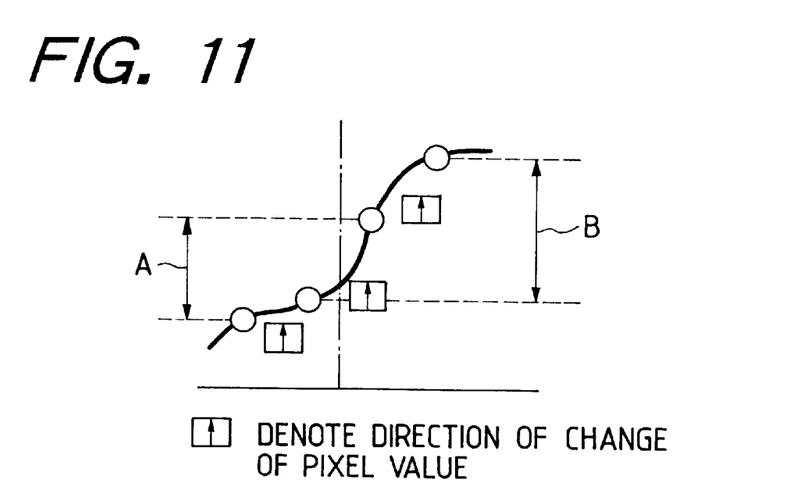
FIG. 11 is a view for explaining the operation of the block distortion information generation circuit 603 shown in FIG. 10.

FIG. 11 is a view for explaining the operation of the block distortion information generation circuit 603 shown in FIG. 10.

The broken line indicates a block boundary, and ○ indicates a pixel. In FIG. 11, widths A and B indicated by arrows are calculated by the subtracter 1005. If the absolute value is smaller than the threshold value TH, it is determined that the block distortion is conspicuous. If the absolute value is larger than the threshold value TH, it is determined that the pixel is at the edge portion of the image.

The subtracters 1003 and 1004 detect the directions of changes from pixel values on the left and right sides of the block edge. Only when the directions of changes equal, block distortion correction processing is performed. If the peak of the pixel value is present at the block edge, block distortion correction processing is not performed. With this operation, the peak of the pixel value is prevented from being sliced.

Figure 12:
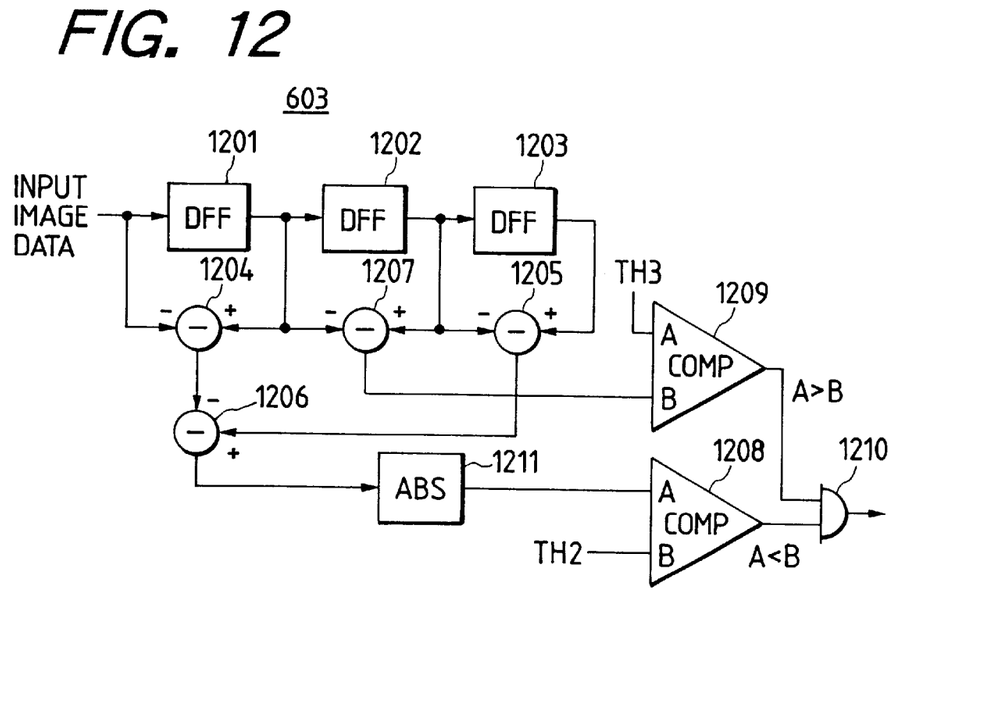
FIG. 12 is a block diagram showing the second arrangement of the block distortion information generation circuit 603.

FIG. 12 is a block diagram showing the second arrangement of the block distortion information generation circuit 603.

Referring to FIG. 12, the block distortion information generation circuit 603 comprises DFFs 1201, 1202, and 1203, subtracters 1204, 1205, 1206, and 1207, comparators 1208 and 1209, an AND gate 1210, and an absolute value circuit 1211.

The change amounts of pixel values in the block are calculated by the subtracters 1204 and 1205, and the difference absolute value between two change amounts is compared with a threshold value TH2 by the comparator 1208. When the difference absolute value is less than TH2, the comparator 1208 outputs a signal of a high level.

The change amounts of two pixels at the block edge are calculated by the subtracter 1207 and compared with a threshold value TH3 by the comparator 1209. If the edge of the image is not included between the blocks, it is determined that the block distortion is large, and correction processing is performed. When TH3 is larger than the change amount of the pixel value, the comparator 1209 outputs a signal of high level.

In this arrangement, the approximation of the change amount of a pixel in the block is detected. When an image in which the change amounts of pixel values are approximated is present in two blocks, and this image includes a block boundary, it is determined that the change amount of the pixel value has changed and the block distortion is large.

Figure 13:
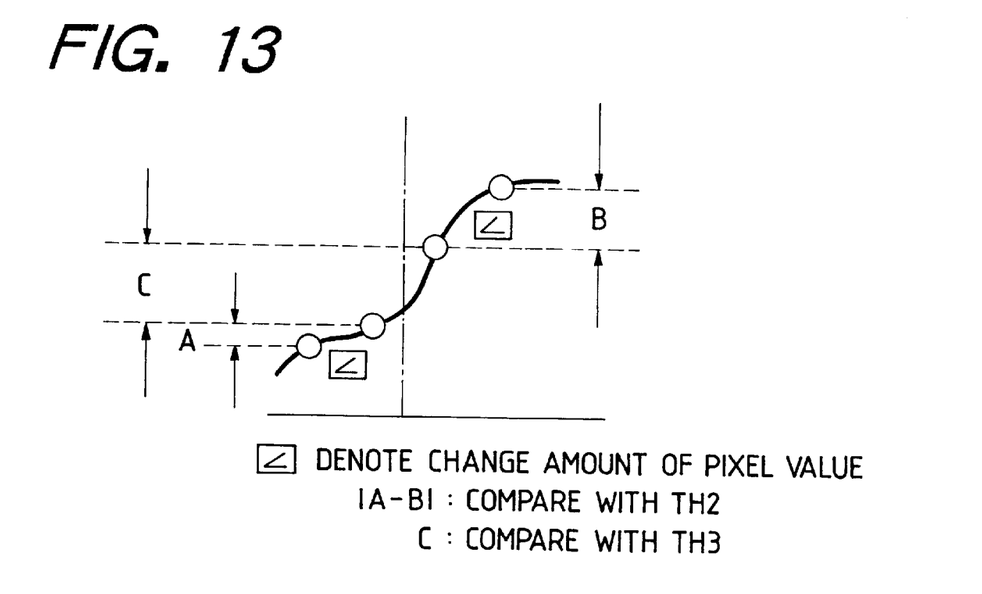
FIG. 13 is a view for explaining the block distortion information generation circuit 603 shown in FIG. 12.

FIG. 13 is a view for explaining the operation of the block distortion information generation circuit 603 shown in FIG. 12.

The broken line indicates a block boundary, and ○ indicates a pixel. In FIG. 13, when the difference between widths at two portions indicated by arrows is equal to or smaller than the threshold value TH2, and the difference between the pixel values at the block edge is equal to or smaller than the threshold value TH3, it is determined that the block distortion is large.

As has been described above, according to the first embodiment of the filter circuit 18, when noise removal filter processing is to be performed using the local nature of a reproduced image signal, the filter condition is adaptively switched at the block boundary. With this arrangement, noises different in nature, e.g., mosquito noise and block distortion can be simultaneously and effectively minimized, and at the same time, an increase in circuit scale can be suppressed.

According to the second embodiment of the filter circuit 18, pixels and the number of pixels are adaptively selected in filtering. With this arrangement, filtering processing can be performed with a circuit arrangement which requires no divider, so that the circuit scale can be reduced.

According to the third embodiment of the filter circuit 18, a visual degradation in image quality caused by the block distortion of the reproduced image can be corrected, so that a high-quality reproduced image signal can be obtained.

In other words, the foregoing description of embodiments has been given for illustrative purposes only and not to be construed as imposing any limitation in any respect.

To scope of the invention is, therefore, to be determined solely by the following claims and is not limited by the text of the specifications and alterations made within a scope equivalent to the scope of the claims fall within the true spirit and scope of the invention.

What is claimed is:

1. An image processing apparatus comprising:
    a) an input device, arranged for inputting image data which is coded in units of blocks each consisting of a plurality of pixels;
    b) a decoder, arranged for decoding the image data input by said input device;
    c) a detector, arranged for detecting whether or not a pixel of the image data decoded by said decoder is located at a boundary between the blocks;
    d) a filter, arranged for filtering the image data decoded by said decoder; and
    e) a selector, arranged for adaptively selecting the number of pixels used for processing by said filter, wherein said selector compares a value associated with a pixel adjacent to a pixel to be subjected to the processing by said filter with a threshold value and selects the pixels used for the processing by said filter based on a result of the comparison, and wherein the threshold value is changed according to a detection result of said detector.

2. An apparatus according to claim 1, wherein said input device includes a reproduction device for reproducing the coded image data from a recording medium.

3. An apparatus according to claim 2, wherein said input device includes a recording device for coding image data and recording the coded image data on the recording medium.

4. An apparatus according to claim 1, wherein the image data input to said input device is data which is coded using an orthogonal transform.

5. A video recorder which is attached to said image processing apparatus recited in claim 1.

6. An image processing apparatus comprising:
    a) an input device, arranged for inputting image data which is coded in units of blocks each consisting of a plurality of pixels;
    b) a decoding device, arranged for decoding the image data input by said input device;
    c) a filter device, arranged for filtering the image data decoded by said decoding device; and
    d) a selection device, arranged for adaptively selecting the number of pixels used for processing by said filter device, wherein said selection device weights a selection processing of the pixels used for the processing by said filter device, according to where in the block the pixel to be filtered is located, and selects a power of 2 as the number of pixels used for filtering processing.

7. An apparatus according to claim 6, wherein said input device includes a reproduction device for reproducing the coded image data from a recording medium.

8. An apparatus according to claim 7, wherein said input device includes a recording device for coding image data and recording the coded image data on the recording medium.

9. A video recorder which is attached to said image processing apparatus recited in claim 6.

10. An image processing method comprising the steps of:
    a) inputting image data which is coded in units of blocks each consisting of a plurality of pixels;
    b) decoding the image data input in the inputting step;
    c) detecting whether or not a pixel of the image data decoded in the decoding step is located at a boundary between the blocks;
    d) filtering the image data decoded in the decoding step; and
    e) adaptively selecting the number of pixels used for processing in the filtering step, wherein said adaptively selecting step includes a step of comparing a value associated with a pixel adjacent to a pixel to be subjected to the precessing in the filtering step with a threshold value and selecting the pixels used for the processing in the filtering step based on a result of the comparing step, and wherein the threshold value is changed according to a detection result in the detecting step.

11. An image processing method comprising the steps of:
a) inputting image data which is coded in units of blocks each consisting of a plurality of pixels;
b) decoding the image data input in said inputting step;
c) filtering the image data decoded in said decoding step; and
d) adaptively selecting the number of pixels used for processing in said filtering step, wherein said adaptively selecting step includes a step of weighting the pixels used for processing in said filtering step, according to where in the block the pixel to be filtered is located, and selects a power of 2 as the number of pixels used for filtering processing.

* * * * *